United States Patent [19]

Taylor

[11] Patent Number: 5,147,556
[45] Date of Patent: * Sep. 15, 1992

[54] THICKENER

[75] Inventor: David Taylor, New South Wales, Australia

[73] Assignee: Supaflo Pty. Limited, Australia

[ * ] Notice: The portion of the term of this patent subsequent to May 14, 2008 has been disclaimed.

[21] Appl. No.: 629,339

[22] Filed: Dec. 19, 1990

Related U.S. Application Data

[63] Continuation-in-part of Ser. No. 436,720, Nov. 15, 1989, Pat. No. 5,015,392.

[30] Foreign Application Priority Data

Nov. 17, 1988 [AU] Australia .................................. PJ1518
Apr. 24, 1989 [AU] Australia .................................. PJ3869

[51] Int. Cl.$^5$ ............................................. B01D 21/24
[52] U.S. Cl. ................................... 210/712; 210/801; 210/127; 210/129; 210/195.1; 210/207; 210/519
[58] Field of Search ............... 209/5, 173; 210/702, 210/709, 712, 714, 723, 732, 738, 96.1, 800, 801, 127, 128, 129, 194, 205, 207, 208, 242.1, 195.1, 519

[56] References Cited

U.S. PATENT DOCUMENTS

| | | | |
|---|---|---|---|
| 1,344,370 | 6/1920 | Allen | 210/96.1 |
| 1,452,016 | 4/1923 | Allen | 210/96.1 |
| 1,472,317 | 10/1923 | Allen | 210/96.1 |
| 2,528,094 | 10/1950 | Walker | 210/207 |
| 2,678,730 | 5/1954 | Coulter | 210/738 |
| 3,532,218 | 10/1970 | von Blottnitz et al. | 210/519 |
| 3,926,805 | 12/1975 | Walker | 210/519 |
| 4,267,052 | 5/1981 | Chang | 210/208 |
| 4,293,416 | 10/1981 | Keoteklian | 210/208 |
| 4,357,242 | 11/1982 | Chandler | 210/207 |
| 4,541,850 | 9/1985 | Oda et al. | 210/519 |
| 5,015,392 | 5/1991 | Taylor | 210/712 |

FOREIGN PATENT DOCUMENTS 1517647 7/1969 Fed. Rep. of Germany ...... 210/208

Primary Examiner—Peter Hruskoci
Attorney, Agent, or Firm—Leydig, Voit & Mayer

[57] ABSTRACT

A thickener for liquids or pulps includes a tank in which flocculation takes place. A feedwell for feed liquid is disposed within the tank and has a restricted bottom opening in fluid communication with the tank. The bottom opening has an effective cross-sectional flow area substantially less than the mean cross-sectional area of the feedwell to restrict the flow of liquid between the tank and the feedwell through the bottom opening and thereby promote homogeneous mixing of the feed liquid within the feedwell. A conduit supplies feed liquid to the feedwell. An aperture is formed in the feedwell or the conduit above the bottom opening and below the upper marginal edge of the feedwell to permit the recirculation of dilute liquid directly from the tank through the aperture and into the feed liquid when the surface level in the tank is higher than the surface level in the feedwell to provide for autogenous dilution of the feed liquid.

20 Claims, 3 Drawing Sheets

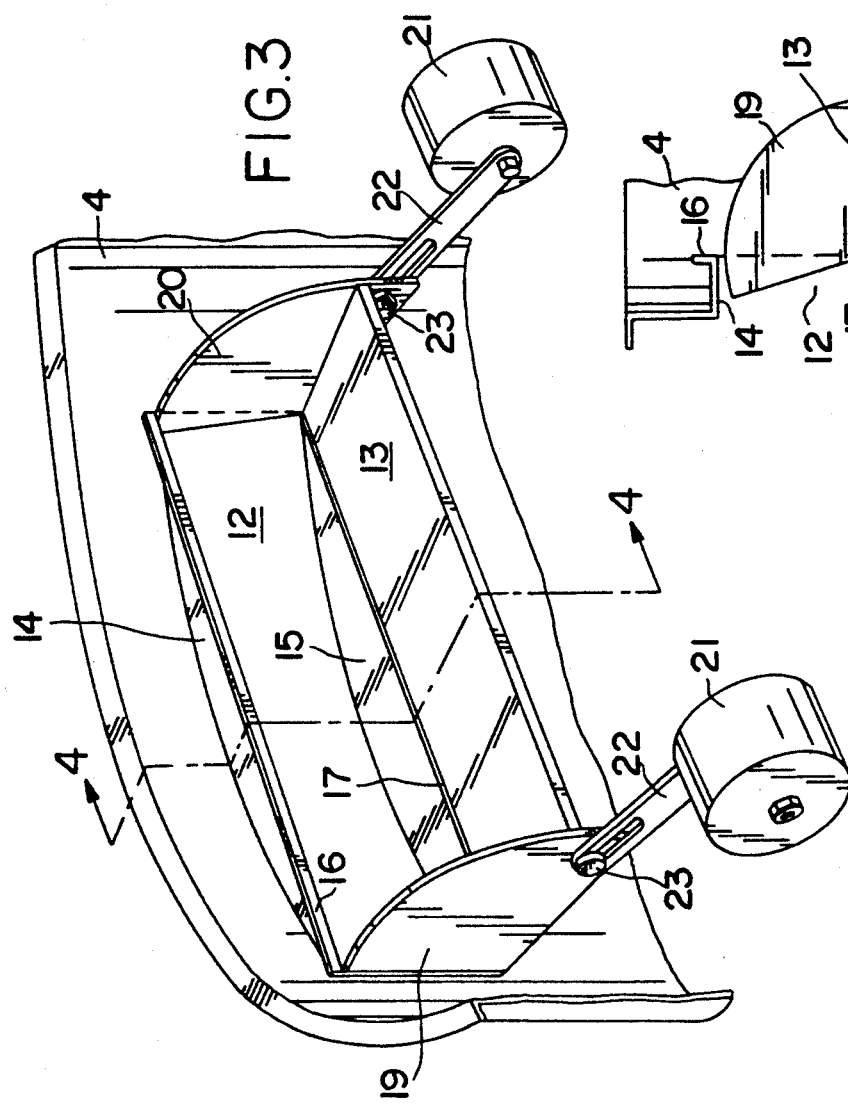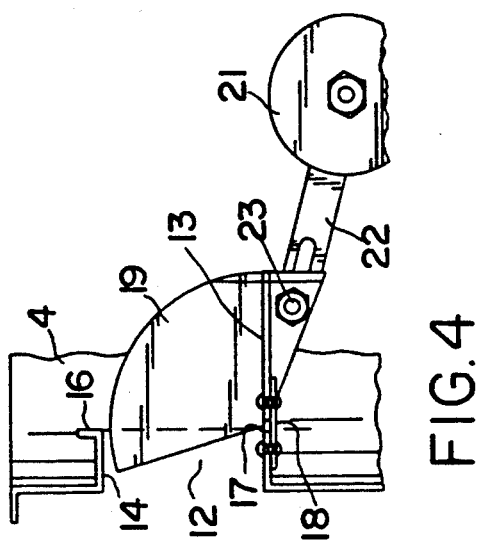

THICKENER

This application is a continuation-in-part of application Ser. No. 07/436,720 filed on Nov. 15, 1989 now U.S. Pat. No. 5,015,392.

FIELD OF THE INVENTION

This invention relates to thickeners for liquid suspensions and pulps and in particular to recycling of overflow liquor in thickeners.

BACKGROUND OF THE INVENTION

In thickening certain pulps, it is sometimes necessary to first dilute the pulp in order to enable flocculation to take place when a polymer flocculant is added. This is usually achieved in thickeners by recycling some of the dilute liquid (known as "liquor") overflow from the top of the thickener tank back to the feedwell in order to dilute the inflowing pulp.

In the past, in order to recycle the overflow liquor it has been necessary to install a system of Pumps, fluid lines and valves. This involves significant capital costs, and gives rise to a further problem of controlling the recycling process, which has hitherto been controlled manually.

It is an object of the present invention to provide a thickener having a system for recycling the dilute liquor overflow from the thickener tank which overcomes or at least ameliorates the above disadvantages.

DISCLOSURE OF THE INVENTION

Accordingly, in a first aspect, the invention consists in a thickener for liquids or pulps, comprising a tank in which flocculation takes place whereby precipitate of higher relative density tends to settle towards the bottom of the tank and dilute liquid of lower relative density is thereby displaced toward the top of the tank, a feedwell disposed generally within the tank to contain feed liquid and having a restricted bottom opening in fluid communication with the tank, the bottom opening having an effective cross-sectional flow area substantially less than the mean cross sectional area of the feedwell to restrict the flow of liquid between the tank and the feedwell through the bottom opening and thereby promote homogeneous mixing of the feed liquid within the feedwell, such that when the relative density of the feed liquid contained within the feedwell is higher than the relative density of the surrounding dilute liquid displaced toward the top of the tank the surface level of the liquid in the feedwell tends to be correspondingly lower than the surface level of the liquid in the tank, said thickener further including conduit means to supply the feed liquid to the feedwell, and an aperture in the feedwell or the conduit disposed above said bottom opening, below the upper marginal edge of the feedwell and positioned to permit the recirculation of dilute liquid directly from the tank through the aperture and into the feed liquid when the surface level in the tank is higher than the surface level in the feedwell to provide for autogenous dilution of the feed liquid.

Preferably, the conduit is disposed generally tangentially with respect to the feedwell to supply the feed liquid substantially tangentially and thereby promote homogeneous mixing within the feedwell.

In the preferred embodiment, a bottom section of the feedwell comprises a generally frusto-conical side wall converging downwardly toward the bottom opening to progressively reduce the effective cross-sectional flow area of the feedwell.

In one embodiment, the aperture takes the form of a side opening in the feedwell, the effective height of which is selectively adjustable by means of a plate formation defining a lower marginal edge of the side opening.

The plate formation preferably comprises a selectively adjustable weir plate hingedly connected to a sidewall of the feedwell adjacent the side opening and movable between an open position permitting the dilute liquid to flow from the tank into the feedwell, and a closed position, substantially restricting the flow between the tank and the feedwell.

In the preferred embodiment, a weir plate incorporating side panels is hingedly connected immediately below a transverse slot in the sidewall of the feedwell. In this configuration the remote upper edge of the weir plate forms the effective lower marginal edge of the side opening such that rotation of the weir plate about the hinge axis provides selective adjustment of the effective height of the side opening whereby the weir plate selectively and progressively establishes fluid flow between the tank and the feedwell.

In an alternative embodiment, the weir plate is mounted immediately below the side opening for vertical sliding along the sidewall of the feedwell, so as to progressively cover at least the lower portion of the side opening to provide selective adjustment of the effective height of the side opening.

The weir plate is preferably controlled by means dependent upon the difference in specific gravity, and hence the difference in height, between the liquids in the thickener tank and the feedwell. In the preferred embodiment, the controlling means includes a float assembly connected with the weir plate and in contact with the liquid surface in the feedwell.

In another embodiment, the conduit comprises a perforate channel extending through the thickener tank and into the feedwell, permitting the flow of dilute liquid directly from the tank, through the apertures and into the conduit, thereby providing for dilution of the inflowing feed liquid within the channel, prior to entering into the feedwell.

According to a second aspect of the invention, there is provided a method of thickening liquids or pulps in a tank, said method comprising the steps of: supplying feed liquid via conduit means to a feedwell disposed generally within the tank and having a bottom opening in fluid communication with the tank; flocculating the liquid in the tank whereby preCipitate of higher relative density tends to settle toward the bottom of the tank and dilute liquid of lower relative density is thereby displaced toward the top of the tank; mixing the contents of the feedwell at least partially by restricting the flow of liquid between the tank and the feedwell through the bottom opening such that the feed liquid is substantially homogenous, so that when the relative density of the feed liquid contained within the feedwell is higher than the relative density of the surrounding dilute liquid displaced toward the top of the tank the surface level of the feed liquid in the feedwell tends to be correspondingly lower than the surface level of the liquid in the tank; and directing a selected recirculation flow of said dilute liquid from the tank through an aperture in said conduit or said feedwell disposed above the bottom opening and below an upper marginal edge of the feedwell and into the feed liquid when the surface level in the tank is higher than the surface level in the feedwell to provide for dilution of the feed liquid.

BRIEF DESCRIPTION OF THE DRAWINGS

A preferred embodiment of the invention will now be described, by way of example only, with reference to the accompanyinq drawings in which:

FIG. 3 is a cutaway perspective view of the feedwell having a slot and weir plate according to the invention; and FIG. 4 is a cutaway side elevation of the feedwell shown in FIG. 3.

PREFERRED EMBODIMENTS OF THE INVENTION

Figure 1:
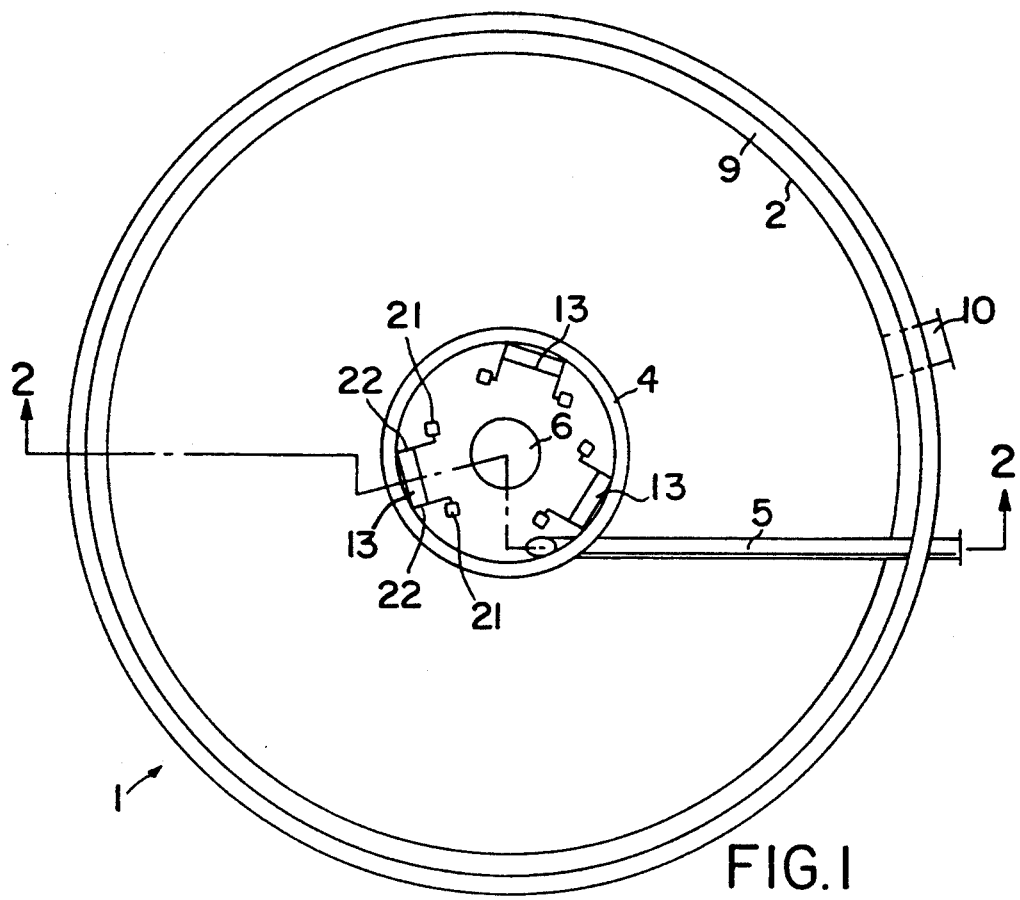
FIG. 1 is a plan view of a thickener and associated feedwell according to the invention.
Figure 2:
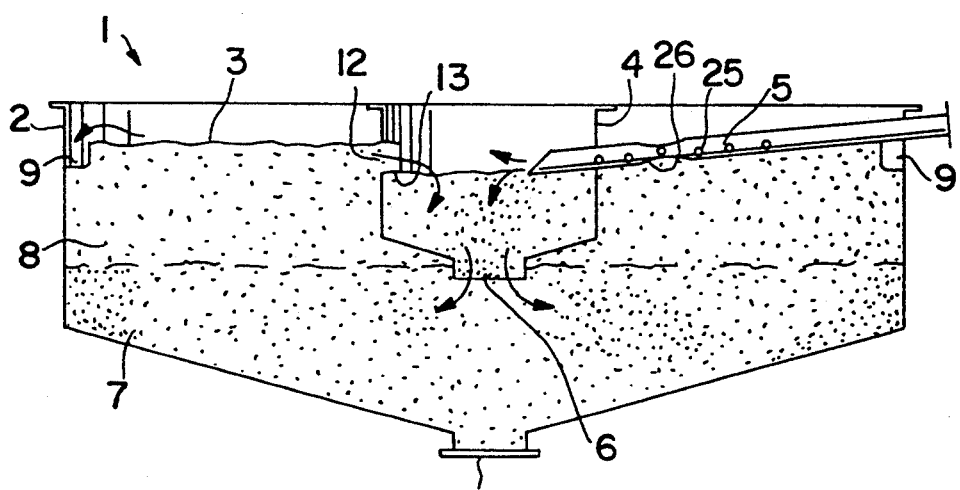
FIG. 2 is a cross-sectional view taken along line 2—2 of FIG. 1.

Referring to the drawings, the thickener 1 includes a tank 2 for containing liquid pulp 3. The thickener 1 has a central feedwell 4 which is supplied via a feed line 5. The feedwell 4 has a restricted bottom opening 6 in fluid communication with the tank, and through which liquid pulp in the feedwell can flow into the tank.

In normal operation, flocculation takes place in the thickener tank, whereby a bed of thickened pulp 7 settles to displace an upper layer of relatively dilute liquid 8 towards the top of the tank. The thickener tank is surrounded by an overflow launder 9 which channels excess overflow liquor to a discharge pipe 10. The thickened pulp 7 is drawn off from below through the underflow withdrawal pipe 11.

The restricted bottom opening 6 of the feedwell 4 has an effective cross-sectional flow area substantially less than the mean cross sectional area of the feedwell to restrict flow of liquid between the tank and the feedwell through the bottom opening and thereby promote homogeneous mixing of the feed liquid within the feedwell.

To this end the bottom section of the feedwell preferably comprises a generally frusto-conical side wall converging progressively downwardly toward the bottom opening to progressively reduce the cross-sectional flow area of the feedwell.

In this configuration, when the relative density of the feed liquid contained within the feedwell is higher than the relative density of the surrounding dilute liquid displaced toward the top of the tank, the surface level of the liquid in the feedwell tends to be correspondingly lower than the surface level of the liquid in the tank.

The feedwell further includes a series of apertures in the form of side slots 12 disposed above the bottom opening 6 and below the upper marginal edge of the feedwell. These apertures permit the recirculation of dilute liquid directly from the tank into the feed liquid when the surface level of the tank is higher than the surface level in the feedwell to provide for autogenous dilution of the feed liquid.

In the preferred embodiment, the feed inlet is disposed generally tangentially with respect to the feedwell to supply the feed liquid substantially tangentially into the feedwell and thereby promote the homogeneous mixing within the feedwell. This tangential mixing effect may also be enhanced by baffle plates disposed within the feedwell.

In one embodiment, weir plates 13 are hingedly connected to the feedwell adjacent the lower edges of the slots 12 such that the slots ca be substantially closed by the weir plates. The weir plates 13 are selectively operable to establish fluid flow communication between the tank 2 and the feedwell 4 via the slots 12 to provide for dilution of the feed liquid in the feedwell by flow of dilute liquid from the tank to the feedwell.

Respective top and bottom plate segments 14 and 15 extend inwardly from the top and bottom edges of the slots to define respective top and bottom straight edges 16 and 17. Each weir plate is connected to a bottom plate segment 15 by a hinge 18 such that when in the closed position, the top edge of the weir plate abuts the top plate segment, substantially closing the slot. Each weir plate 13 has associated side plates 19 and 20 which slidingly abut the side edges of each slot 12 such that as the weir plate is selectively and progressively raised from the horizontal open position, the flow of liquid between the tank and the feedwell through the slot is progressively restricted.

Each weir plate has floats 21 adjustably attached such that the position of the weir plate can be controlled by the height of liquid in the feedwell. In this way the difference in height between the liquid levels in the feedwell and the thickener tank, resulting from the difference in their respective specific gravities or relative densities, can be utilised to cause relatively dilute liquid t flow from the surface of the thickener tank into the feedwell and automatically dilute the incoming pulp as previously described.

When the liquid level in the feedwell is below the level in the thickener tank (i.e. when the specific gravity or relative density of the material in the feedwell is greater than the specific gravity of the liquid outside the feedwell), the floats will allow the weir plates to drop to a fully open position as shown in FIGS. 3 and 4. This permits the maximum ingress of liquid through the slots to dilute the incoming pulp.

When the pulp entering the feedwell is relatively dilute, there is only a small height difference between the liquid in the feedwell and the liquid in the tank. In this case the liquid in the feedwell causes the float to rise to a level such that the weir Plate closes the slot so that substantially no liquid enters the feedwell from the tank, and no pulp flows from the feedwell to the tank through the slot.

The floats 21 on the hinged weir plates 13 may be adjusted by means of adjusting brackets 22 and adjusting bolts 23 such that the quantity of liquid entering the feedwell from the tank maintains a steady and relatively uniform dilution of the liquid in the feedwell.

In an alternative embodiment the inlet feed line 5 (which may simply comprise an open channel) includes apertures or perforations 25. As inflowing feed liquid flows through the feed line towards the feedwell, the dilute liquid near the surface of the thickener tank is permitted to enter the feed inlet line directly through the apertures or perforations 25 and thereby progressively dilute the feed liquid within the feed line, before it is discharged into the feedwell. In this way, it will be apparent that the perforations 25 in the feed line perform substantially the same function as the side slots 12 in the feedwell as previously described, and essentially the same auto-dilution mechanism operates in substantially the same way.

In addition, the feed line can include a venturi section 26 of reduced cross-sectional area to induce flow of the dilute liquid from the tank into the feed line by means of a velocity induced pressure differential to provide for dilution of the feed liquid within the channel. It will be apparent that this form of the invention can also be used in combination with the embodiments previously described.

This thickener provides a relatively cheap and efficient system for automatically recycling dilute liquor overflow from the thickener tank to dilute the pulp in the feedwell without the need for a complex system of valves, pumps and fluid lines.

Although the invention has been described with reference to specific examples, it will be appreciated by those skilled in the art that the invention may be embodied in many other forms. For example, the thickener need not include an adjustable weir plate, but may simply include one or more slots or openings in the feedwell sidewall an located at appropriate predetermined positions to establish the flow of dilute liquor from the tank to the feedwell. In this case, the lower edge and hence the effective height of the side opening is defined by the edge of the feedwell sidewall immediately adjacent and below the opening.

Alternatively a plate forming part of the feedwell sidewall and defining the effective lower marginal edge of the side opening may be selectively adjustable between any one of a number of predetermined discrete positions to provide adjustment of the effective height of the side opening. These discrete positions may correspond to plate locating formations, such as a vertical array of bolt holes for example.

Figure 5:
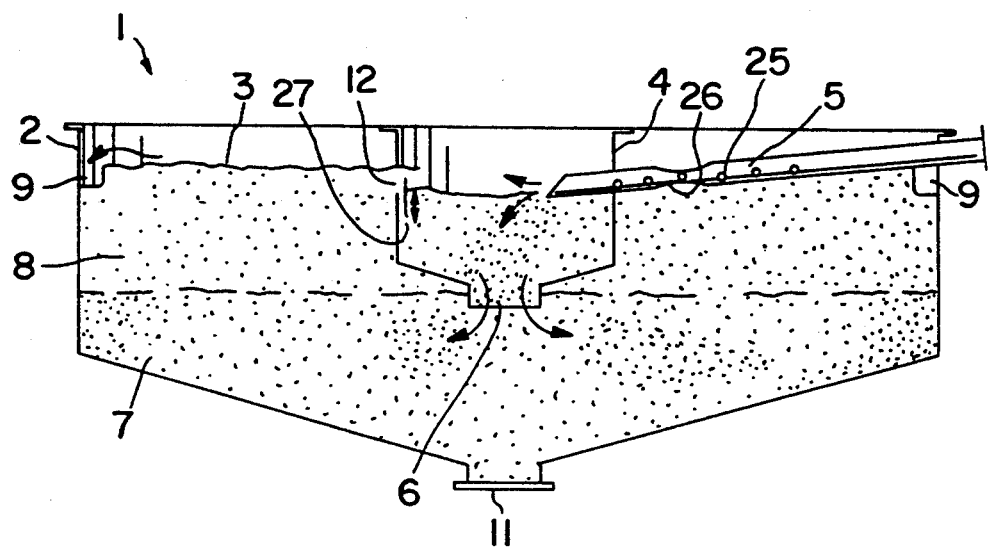

FIG. 5 is a cross-sectional view of an embodiment of the present invention having a weir plate 27 connected with the side wall of the feedwell 4 for vertical sliding movement across the slot 12.

What is claimed is:

1. A thickener for liquids or pulps comprising:
   a tank in which flocculation takes place whereby precipitate of higher relative density tends to settle towards the bottom of the tank and dilute liquid of lower relative density is thereby displaced toward the top of the tank;
   a feedwell for feed liquid disposed generally within the tank and having a restricted bottom opening in fluid communication with the tank, the bottom opening having an effective cross-sectional area substantially less than the mean cross-sectional area of the feedwell to restrict the flow of liquid between the tank and the feedwell through the bottom opening and thereby promote homogeneous mixing of the feed liquid within the feedwell;
   a conduit for supplying the feed liquid to the feedwell; and
   an aperture formed in the feedwell or the conduit above the bottom opening and below the upper marginal edge of the feedwell, the aperture and the bottom opening being sized and arranged to create a difference in height between the surface level of the surrounding dilute liquid in the tank and a more dense feed liquid contained within the feedwell, the aperture being positioned to permit the recirculation of dilute liquid directly from the tank through the aperture and into the feed liquid when the surface level of the tank is higher than the surface level in the feedwell to provide for autogenous dilution of the feed liquid.

2. A thickener according to claim 1 wherein the conduit is disposed generally tangentially with respect to the feedwell to supply the feed liquid tangentially into the feedwell and thereby promote homogeneous mixing of the feed liquid.

3. A thickener according to claim 1 wherein the effective cross-sectional flow area of the feedwell progressivley decreases toward the bottom opening.

4. A thickener according to claim 1 wherein the feedwell has a bottom section comprising a generally frustro-conical side wall converging progressively downwardly toward the bottom opening to define a progressively decreasing cross-sectional flow area.

5. A thickener according to claim 1 comprising a plurality of apertures in the feedwell to permit recirculation of dilute liquid directly from the tank into the feed liquid.

6. A thickener according to claim 1 wherein the aperture comprises an opening in a side of the feedwell.

7. A thickener according to claim 6 further comprising a weir plate connected with the side of the feedwell adjacent the aperture for vertical sliding movement between an open position permitting the dilute liquid to flow from the tank into the feedwell through the aperture and a closed position substantially restricting flow through the aperture.

8. A thickener according to claim 1 wherein the conduit comprises a channel extending through the thickener tank and into the feedwell and having an aperture formed therein for permitting flow of the dilute liquid directly from the tank into the channel to dilute the feed liquid.

9. A thickener according to claim 1 wherein the conduit comprises a venturi section including at least one aperture to induce flow of the dilute liquid directly from the tank through the aperture and into the conduit by means of a velocity induced pressure differential to dilute the feed liquid.

10. A thickener for liquids or pulps comprising a tank in which flocculation takes place and a diluting liquid is displaced toward the top of the tank, a feedwell having a bottom opening in fluid communication with the tank, a conduit for a feed liquid extending through the thickener tank and into the feedwell, a venturi in the conduit, and aperture means for introducing the diluting liquid directly from the tank into the conduit in response to a pressure differential caused by flow of a fluid through the venturi for autogenous dilution of the feed liquid.

11. A thickener according to claim 10 wherein the conduit has an end extending into the feedwell substantially tangentially with respect to the feedwell.

12. A thickener for liquid or pulps comprising:
   a tank in which flocculation forms a precipitate settling towards the bottom of the tank and displacing a diluting liquid of lower density than the precipitate toward the top of the tank;
   a feedwell for a feed liquid disposed within the tank and having an upper edge and a bottom;
   an inflow aperture for the diluting liquid formed in the feedwell between the upper edge and the bottom of the feedwell;
   a conduit having an end extending into the feedwell for supplying a feed liquid into the feedwell; and
   a discharge opening having an area formed in the feedwell lower than the inflow aperture, the area of the discharge opening restricting the flow of the feed liquid from the feedwell into the tank, the inflow aperture and the discharge opening being sized and arranged to create a difference in height between the surface level of the surrounding diluting liquid in the tank and a more dense feed liquid contained within the feedwell.

13. A thickener according to claim 12 wherein the feedwell has a cross-sectional area that progressively decreases from the inflow aperture toward the discharge opening.

14. A thickener according to claim 12 wherein the feedwell has a frustro-conical bottom and the discharge opening is formed in the frustro-conical bottom.

15. A thickener according to claim 12 wherein the conduit includes a venturi and aperture means for introducing the diluting liquid directly from the tank into the conduit when liquid flow through the venturi generates a pressure differential for autogenous dilution of the feed liquid.

16. A method of thickening liquid or pulps in a tank comprising:
supplying a feed liquid via a conduit to a feedwell disposed generally within the tank and having a bottom opening in fluid communication with the tank;
flocculating the liquid in the tank whereby precipitate of higher relative density tends to settle toward the bottom of the tank and dilute liquid of lower relative density is thereby displaced toward the top of the tank;
mixing the contents of the feedwell at least partially by restricting the flow of liquid between the tank and the feedwell through the bottom opening such that the feed liquid is substantially homogeneous; and
directing a flow of the dilute liquid from the tank through an aperture in the conduit or the feedwell disposed above the bottom opening and below the upper marginal edge of the feedwell and into the feed liquid when the surface level in the tank is higher than the surface level in the feedwell to dilute the feed liquid, the aperture and the bottom opening being sized and arranged to create a difference in height between the surface level of the surrounding dilute liquid in the tank and a more dense feed liquid contained within the feedwell.

17. A method of thickening liquids or pulp in a tank in which flocculation takes place and dilute liquid is displaced toward the top of the tank comprising supplying a feed liquid via a conduit into a feedwell having a bottom opening in fluid communication with the tank and an aperture below an upper edge of the feedwell, and opening and closing the aperture in accordance with the level of liquid in the feedwell to introduce dilute liquid directly from the tank into the feedwell for autogenous dilution of the feed liquid.

18. A method of thickening liquids or pulps in a tank comprising:
supplying a feed liquid via a conduit to a feedwell disposed within a tank and having a bottom opening in fluid communication with the tank;
flocculating the liquid in the tank to produce a precipitate settling toward the bottom of the tank and displacing a diluting liquid of lower density than the precipitate toward the top of the tank;
restricting the flow of feed liquid between the tank and the feedwell through the bottom opening of the feedwell such that the relative density of the feed liquid contained within the feedwell is higher than the relative density of the diluting liquid in the tank; and
introducing the diluting liquid from the tank into the feedwell via an aperture in the feedwell, the aperture and the bottom opening being sized and arranged to create a difference in height between the surface level of the surrounding diluting liquid in the tank and a more dense feed liquid contained within the feedwell.

19. A method as claimed in claim 18 wherein the step of introducing the diluting liquid into the feedwell comprises creating a pressure differential between the inside of the conduit and the inside of the tank and drawing the diluting liquid into the conduit from the tank through an aperture in the conduit.

20. A thickener for liquids or pulps comprising:
a tank in which flocculation takes place whereby precipitate or higher relative density tends to settle towards the bottom of the tank and dilute liquid of lower relative density is displaced toward the top of the tank;
a feedwell disposed generally within the tank to contain feed liquid and having a restricted bottom opening in fluid communication with the tank, the bottom opening having an effective cross-sectional flow area substantially less than the mean cross-sectional flow area of the feedwell to restrict the flow of liquid between the tank and the feedwell through the bottom opening and thereby promote homogeneous mixing of the fed liquid within the feedwell;
a conduit for supplying the feed liquid to the feedwell; and
an aperture formed in the feedwell or the conduit and disposed above the bottom opening below an upper marginal edge of the feedwell to permit a flow of dilute liquid directly from the tank through the aperture and into the feed liquid, the aperture and the bottom opening being sized and arranged to create a difference in height between the surface level of the surrounding dilute liquid in the tank and a more dense feed liquid contained within the feedwell, the rate of the flow corresponding to the height differential between the surface level in the tank and the surface level in the feedwell, thereby providing automatically controlled recirculation of dilute liquid directly from the tank for autogenous dilution of the feed liquid.

* * * * *

UNITED STATES PATENT AND TRADEMARK OFFICE
CERTIFICATE OF CORRECTION

PATENT NO. : 5,147,556
DATED     : SEPTEMBER 15, 1992
INVENTOR(S) : DAVID TAYLOR

It is certified that error appears in the above-identified patent and that said Letters Patent is hereby corrected as shown below:

CLAIM 20, COLUMN 8, LINE 38, CHANGE "FED" TO --FEED--.

Signed and Sealed this

Nineteenth Day of January, 1993

Attest:

DOUGLAS B. COMER

*Attesting Officer*     Acting Commissioner of Patents and Trademarks